Jan. 3, 1967  E. L. CHENOWITH  3,295,218
CHECKING FIXTURE

Filed March 18. 1965  2 Sheets-Sheet 1

INVENTOR.
Edward L. Chenowith
BY
Harness, Dickey & Pierce
ATTORNEYS.

Jan. 3, 1967  E. L. CHENOWITH  3,295,218
CHECKING FIXTURE
Filed March 18, 1965  2 Sheets-Sheet 2
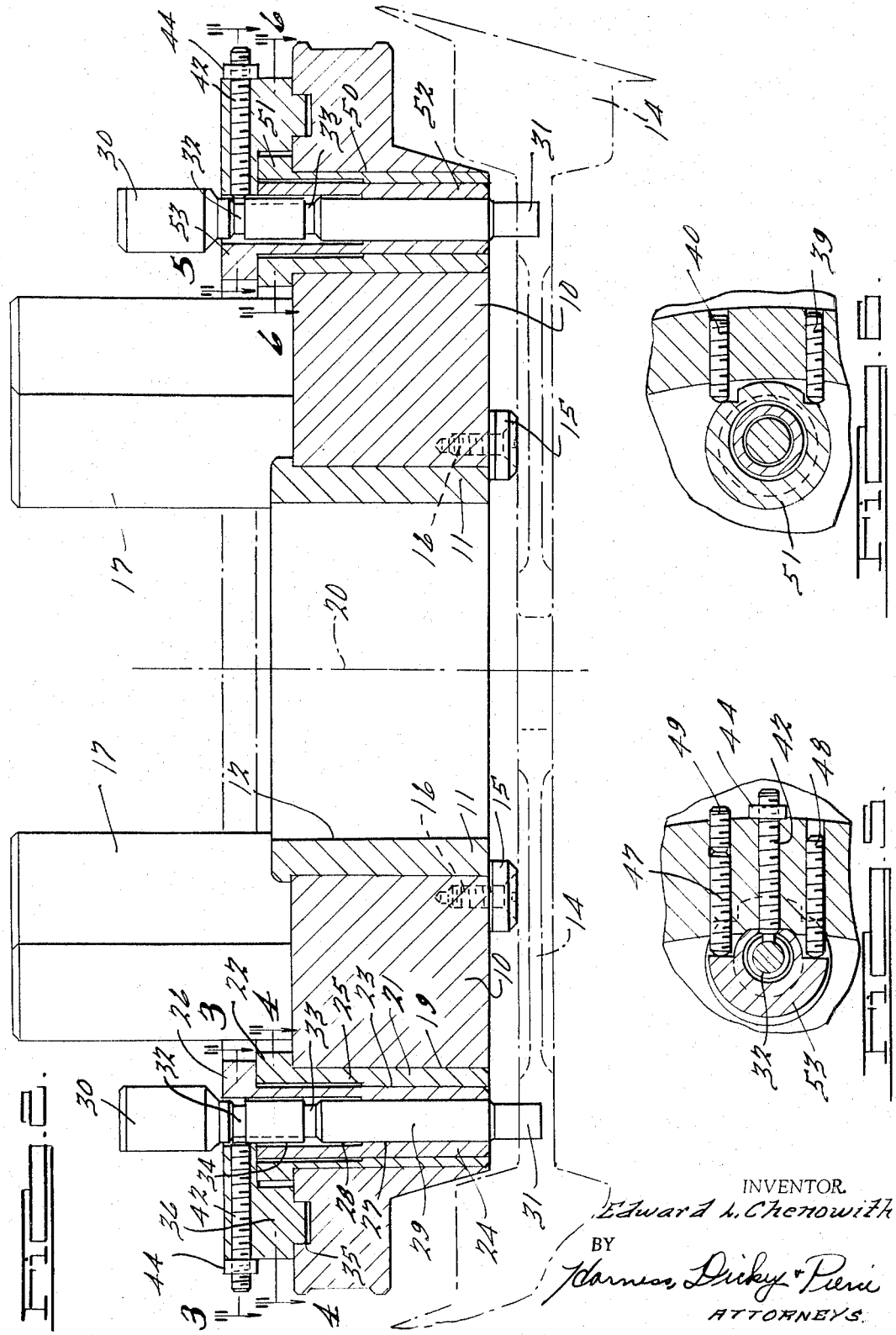
INVENTOR.
Edward L. Chenowith
BY
Harness, Dickey & Pierce
ATTORNEYS United States Patent Office 3,295,218
Patented Jan. 3, 1967

1

3,295,218
CHECKING FIXTURE
Edward L. Chenowith, St. Clair Shores, Mich., assignor to Machine Products Corp., Detroit, Mich., a corporation of Michigan
Filed Mar. 18, 1965, Ser. No. 440,867
9 Claims. (Cl. 33—174)

This invention relates generally to checking fixtures.

More particularly, it relates to a checking fixture of extreme accuracy for verifying the location of a plurality of holes or apertures in a given workpiece.

It is a primary object of the present invention to provide a checking fixture which can be calibrated, recalibrated and adjusted in order to assure maximum accuracy.

As will hereinafter be more clearly brought out, the invention provides a master gauge or checking fixture which can be adjusted or calibrated to maximum accuracy, virtually, within the limits which it is possible to measure with accuracy.

Furthermore, the checking fixture of the present invention can be easily and simply adjusted, from time to time, as may be required.

It is readily appreciated that in present day manufacture there are a great many parts, such as for missiles, jet engines and other analogous applications, where a plurality of holes in a given workpiece must be located with an extremely high degree of precision in order that the position of these holes, with respect to each other, with extremely small limits, can be accurately verified.

While it will be apparent from the following specification that a great many various and different fixtures may be produced, embodying the improvements hereinafter described, a single specific fixture is shown, by way of example, in the drawings forming a part hereof.

In the drawings:

FIGURE 2 is a transverse sectional view of the fixture shown in FIGURE 1, taken substantially along the line 2—2 of FIGURE 1;

FIGURE 5 is a fragmentary transverse sectional view, taken substantially along the line 5—5 of FIGURE 2; and FIGURE 6 is a fragmentary transverse sectional view similar to FIGURE 5, taken substantially along the line 6—6 of FIGURE 2.

Figure 1:
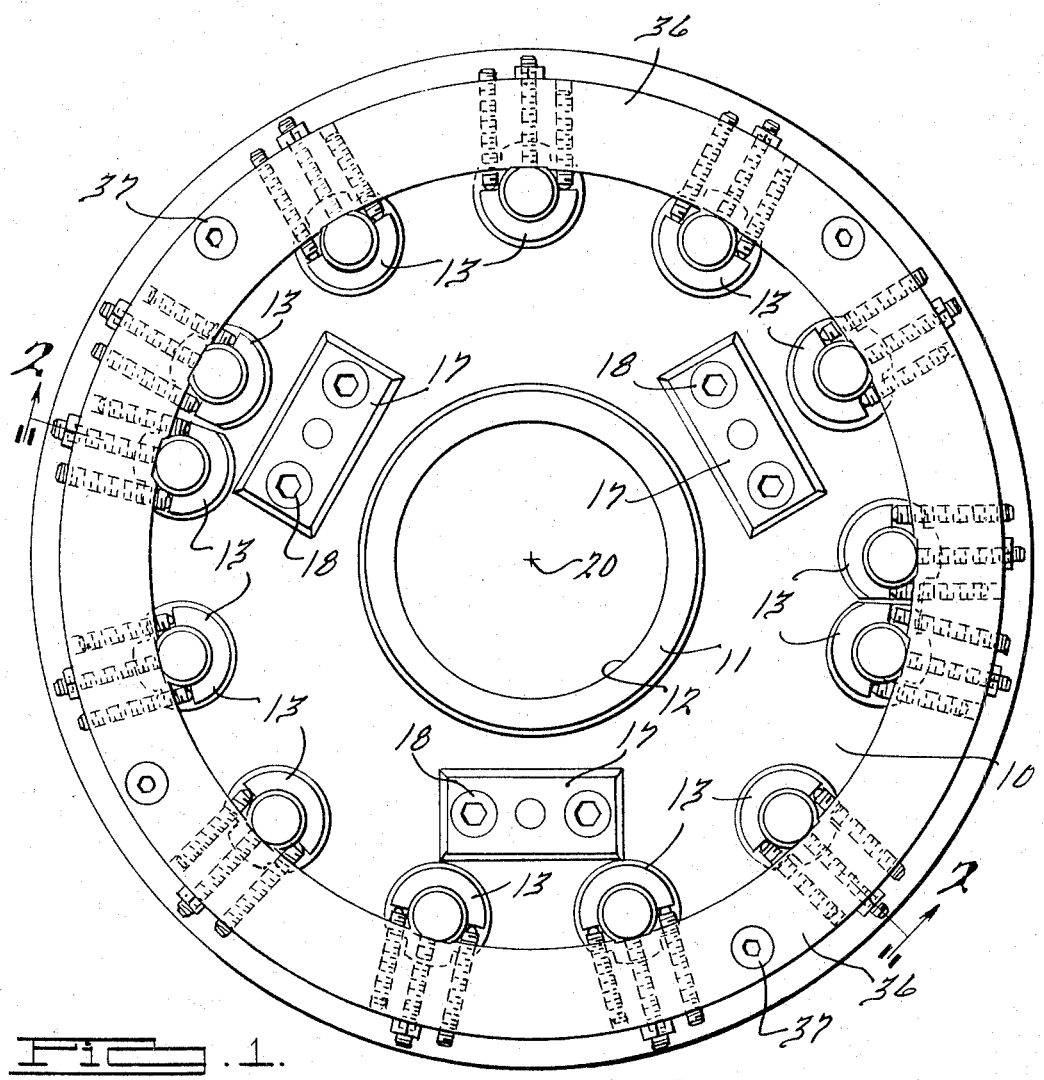
FIGURE 1 is a plan view of a checking fixture for accurately verifying the location of an annular series of holes in a workpiece to determine, with great accuracy, not only the proper radial position with respect to the central axis of the workpiece, but also their circumferential position with respect to each other.

It will be readily appreciated that the specific fixture shown in the drawings and described in detail below, is merely illustrative of the general type of fixture to which the present invention relates, and it will be obvious that many other and different forms and types of fixtures many be designed and produced embodying the general improvements forming the subject matter of this invention.

With more particular reference to the specific checking fixture construction shown in the drawings, it will be seen that this fixture comprises a generally annular body portion 10. This body portion may be formed of cast iron such, for example, as mehanite. This body portion obviously may be formed of any other suitable material having a high degree of hardness and a high degree of dimensional stability.

The body portion 10 has a central opening which, in the construction shown in the drawings, has a sleeve 11 permanently fixed in the central opening thereof. The sleeve 11 is preferably internally ground to provide a cylindrical bore 12, which has a high surface finish and is formed as accurately as possible to true cylindrical configuration.

In the particular fixture shown in the drawings, some thirteen separate checking stations are provided. These checking stations, designated generally 13, are substantially similar in construction and function and, therefore, it it only necessary to describe in detail the particular checking stations shown in the sectional views of the drawings.

This particular fixture is designed and constructed in such a way that it may be used in either one or two positions. The part to be checked is shown in dotted lines and generally designated 14. As is clear from FIGURE 2 of the drawings, the fixture may be bodily placed on top of the workpiece to be checked. In order to locate the fixture properly, with respect to the workpiece, when the fixture is used in this manner the underside of the fixture is provided with an annular series of bosses or spacer blocks 15, each of these blocks is individually secured to the body of the fixture by means of screws 16. These bosses serve to maintain the body of the fixture proper in spaced relationship to the workpiece being checked and serve to locate the fixture in proper relationship thereto.

The fixture can also be used in upside down position from that shown in FIGURE 2. When used in this manner, the fixture can be supported on a surface plate or other work table. To accomplish this, the fixture is provided with a plurality of supporting posts 17, rigidly anachored to the upper surface of the fixture by means of screws 18, as is shown in FIGURES 1 and 2 of the drawings. These posts are, in the embodiment shown, three in number, and are all of equal height, having flat ground upper surfaces lying in the same plane so that when the fixture is used in the upside down position from that shown in the drawings, these posts serve to provide the sole support for the entire fixture and maintain it in suitable spaced relation to the work table or surface plate on which it may be located. These posts provide support for the fixture and, at the same time, permit adjustment of the operative parts thereof during the checking operation, as will be more clearly seen hereafter.

Each of the checking stations shown in FIGURE 1 of the drawings are generally similar in construction and function, and a detailed description thereof is set forth below.

Each of the checking stations 13 are initially located by means of a cylindrical bore 19 extending through the body of the fixture from top to bottom. The bores 19 may be produced on a jig bore or similar machine tool and, at the time they are formed, every effort is made to locate them as accurately as possible, not only with respect to the central axis 20 of the fixture, but with respect to each other as far as their circumferential spacing is concerned. These bores are formed, as nearly as possible, of truly cylindrical configuration, with a smooth, highly finished interior surface and, as nearly as possible, precisely parallel to the central axis 20 of the fixture body.

As is best seen in FIGURE 2, the bore 19 has received therein a collared sleeve 21 having a radially extending flange 22 on its upper end. This sleeve is of a length sufficient to extend throughout the length of the bore 19 and has a smooth, external cylindrical surface having an outside diameter closely approximating the inside diameter of the bore 19 whereby the sleeve will be snugly received within the bore 19, but at the same time will be capable of rotation therein.

The sleeve 21 has a smooth cylindrical bore 23 therethrough which bore, while having its axis parallel to the axis of the cylindrical outer surface of the sleeve, has such axis slightly offset therefrom. The importance and significance of this offset construction will be clearly apparent hereinafter.

Interiorly of the sleeve 21 is a second adjusting sleeve 24 which, like the sleeve 21, has a smooth cylindrical outer surface and is adapted to be snugly received in the bore 23 of the sleeve 21 and rotatable therein. As shown in the drawings, the cylindrical bore through the sleeve 21 may, if desired, be provided with a counterbore 25 throughout a portion of its length simply for the purpose of reducing surface friction between the sleeves 21 and 24 when relative movement between them is desired.

The sleeve 24 has a radially extending annular flange or collar 26 at its upper end, similar to the collar 22 on the sleeve 21, which collar overlies the flange 22 on the sleeve 21.

The sleeve 24 has a cylindrical bore 27 therethrough, which bore may be counterbored as shown at 28 in FIGURE 2. The axis of the bore 27 is slightly offset from but parallel to the axis of the cylindrical outer surface of the sleeve 24.

While it is not in any way essential to the proper functioning of the checking device herein described, it has been found desirable to have the distance which the axis of the bore 27 is offset from the axis of its cylindrical outer surface, identical to the distance which the axis of the bore 23 is offset from the axis of the cylindrical outer surface of the sleeve 21.

Snugly received within the interior bore 27 of the sleeve 21 is a cylindrical surfaced checking pin 29 which pin, while snugly received in said bore, is rotatable therein and also axially movable with respect thereto in the manner hereinafter described in detail. The pin 29 has a handle or knob 30 on its upper end to facilitate manual adjustment of the pin in the manner hereinafter described in detail.

The lower end of the pin 29 has a cylindrical checking portion 31. The cylindrical surface of said checking portion being precisely coaxially arranged with respect to the axis of the body of the pin 29. This checking portion is adapted to protrude from the body of the fixture and enter a hole in the workpiece which the fixture is adapted to check.

Adjacent its upper end, the pin 29 has a pair of spaced annular grooves or recesses 32 and 33, which are axially spaced from each other. These grooves may be interconnected by an axially extending slot 34 in the surface of the pin, the purpose and function of which is described in detail below.

Secured in an annular groove 35 on the upper surface of the body of the fixture is a ring member 36, which may be anchored to the body of the fixture by means of screws 37. This ring functions in much the same way as if it were formed as an integral part of the body of the fixture and securing it to the fixture as a separate part, as shown in the drawings, merely makes is possible to utilize a basic body design for fixtures of this general type for use in a number of different fixtures.

Figure 4:
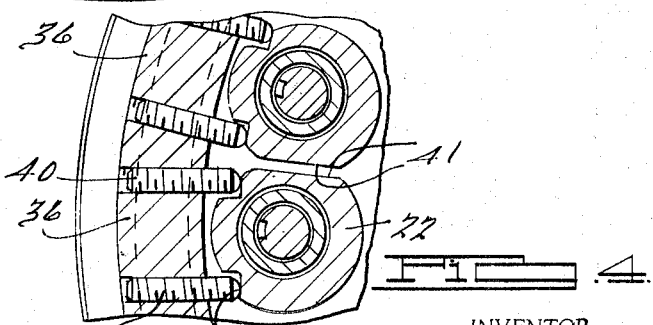
FIGURE 4 is a fragmentary transverse sectional view similar to FIGURE 3, taken substantially along the line 4—4 of FIGURE 2.

As is best seen in FIGURE 4 of the drawings, the flange 22 on the upper end of the sleeve 21 has a pair of notches therein to provide a pair of flat adjusting surfaces 38 lying generally in the same plane, one on each side of the axis of the sleeve. One of these flat surfaces is engaged by a set screw 39 and the other by a set screw 40, each of said set screws threadably received in a suitably threaded aperture in the ring 36. In addition to the flat surface 38, the flanges 22 may have cut away portions 41 which may be required when two checking positions are so closely spaced that interference between the two adjacent flanges might otherwise result.

It will be clear from the above described construction that when the set screw 39 is advanced, and the related set screw 40 is retracted, or vice versa, the movement of these screws will result in rotational movement of the sleeve 21 in the bore 19.

Figure 3:
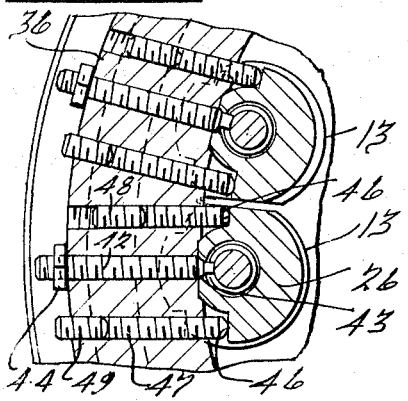
FIGURE 3 is a fragmentary sectional view of two adjacent checking stations on the fixture shown in FIGURE 1, taken substantially along the line 3—3 of FIGURE 2.

Referring now more specifically to FIGURE 3, it will be seen that a set screw 42 passes through a suitable radially extending internally threaded aperture in the ring 36. This set screw has a reduced diameter nose portion 43 adapted to enter into and be received by the annular grooves 32 and 33 in the pin 29. This set screw is ordinarily locked in predetermined adjusted position by means of a lock nut 44. It will be apparent that when the nose portion 43 of the set screw is within either of the grooves 32 or 33 in the pin 29, the pin can be freely rotated through a full 360°. It is also apparent that when rotated to a predetermined adjusted position, the pin 29 may be moved axially, the nose portion 43 of the pin passing from the groove 32 to the groove 33, or vice versa, through the axially extending slot 34. This construction makes it possible for the pin 29 to be easily moved manually from a fully extended to a fully retracted position, and the grooves 32 and 33 serve to return the pin in either a fully extended or fully retracted position, as may be desired.

The flange 26 has a pair of notches which serve to provide a pair of flat surfaces 46 laying generally in the same plane and located on opposite sides of the axis of the sleeve 21. These flat surfaces are adapted to be engaged by set screws 47 and 48 located in suitable threaded apertures in the ring 36. In order to firmly lock the set screws in finally adjusted position, one of the set screws may be permanently anchored by means of a followup locking screw 49.

The checking station on the opposite side of the fixture shown in FIGURE 2 and in FIGURES 5 and 6 is much the same in construction and function as the checking stations described in detail above. A bore 50 through the body of the fixture is provided with its axis located as closely as possible to the predetermined desired position. This bore has its axis parallel to the axis 20 of the body of the fixture. Rotatably mounted in the bore 50 is a sleeve 51, having a flange upper end 52. The sleeve, like the sleeve 21, has an axial bore therethrough, which axis is offset from the axis of its cylindrical outer surface. Located within this bore is a second sleeve 52, having a flange or collar 53 on its upper end, overlying the flange 51. This sleeve, like the sleeve 24, has an axially offset cylindrical bore for receiving the checking pin 30.

From the foregoing, it will be seen that the pin 30 in this location in the checking fixture, can be adjusted in the same manner as the corresponding pins 30 in the locations above first described in detail.

The ultimate accuracy of the finished part which it is desired to obtain will, obviously, have a considerable bearing on the dimensions of the component parts of the checking fixture of the present invention. While the particular tolerances and dimensions described in detail below form no part of the present invention, it is believed that reference to specific dimensions will facilitate an understanding of the basic inventive concept with which the present invention is concerned.

In general, it is preferable to have the flat surfaces 38 located in precisely predetermined position with respect to the axis of the bore 23 of the sleeve 19. It is desirable that the location of these flat surfaces be such that the plane in which the flat surfaces 38 lie, is perpendicular to a line passing through the axis 20 of the body of the fixture. With these flat surfaces so arranged, the axis of the bore of the sleeve 21 will be closest the axis 20 of the body of the fixture. If this precise relationship is maintained at the time the flats 38 are formed on the flange 22, it will be apparent that any adjustment of the set screws 39 and 40 must, of necessity, result in movement of the position of the axis of the bore 23 slightly away from the axis 20 of the body of the fixture.

Conversely, it is desirable to locate the flats 46 in opposite fashion with respect to the offset axis of the bore 27 through the sleeve 24. These flats should be so located that when they lie in a plane tangential to the largest circle, whose center coincides with the center axis 20 of the fixture body, the axis of the cylindrical bore 27 will be at a maximum distance from the axis 20.

If the flats 38 are thus located and formed, any adjustment of the set screws 47 and 48 will, of necessity, result in moving the position of the axis of the bore 27 closer to the axis 20 of the body of the fixture.

If the flats 38 and 46 are located with respect to the axes of the bores through their respective sleeves in precisely the manner described above, and if the flats 38 and 46 are located in parallel planes substantially as shown in the drawings, the eccentricity of one of the sleeves will precisely offset and nullify the effect of the eccentricity of the other sleeve. It, therefore, becomes clear that it the magnitude of the offset of the axis of the bore 23, with respect to the axis of the bore 19, is precisely the same as the offset of the bore 27, with respect to the axis of the bore 23, and if the parts are located in substantially the position shown in the drawings, with the flat surfaces 38 lying in a plane parallel to the plane in which the flat surfaces 46 lie, the effect of the eccentricity of the bores through the sleeves will cancel out entirely and the central axis of the pin 29 will precisely coincide with the axial center of the bore 19 in the body of the fixture.

Since, with modern machine tool equipment, holes such as bores 19 can be located and bored with great accuracy, with respect to the central bore 12, as well as with respect to each other, adjustments of very small magnitude are required to bring a fixture, such as that shown, into a condition of extreme ultimate accuracy.

By way of illustration, let it be assumed that the fixture shown in the drawings is roughly 18 inches in overall diameter, and let it be assumed that the axis of the bore 23 is offset 0.0030 inch with respect to the axis of the cylindrical surface of the sleeve 21. Likewise, let it be assumed that the magnitude of eccentricity of the sleeve 24 is precisely the same, namely 0.0030 inch.

It has been found that adjustment of the set screws 39 and 40 and 48 and 49 are capable, from a practical standpoint, of effecting rotational movement of the respective sleeve elements which they engage throughout an angular movement of about 20°.

From the foregoing, it is obvious that adjustment of these sleeves, with respect to each other and with respect to the bore 19 through the body of the fixture, throughout an angular movement of 20°, makes it possible to relocate the axis of the pin 29 within virtually an infinite number of locations within 9.004 inches of the true mathematical center of the cylindrical bore 19. It must be assumed, therefore, that in the design of any given fixture the magnitude of eccentricity selected for a given application should be sufficient to more than compensate, in full, for the maximum contemplated variation in the location of the primary bores 19 in the fixture body.

There are obviously many ways in which the fixture described above can be brought into finally adjusted condition. The fixture may be anchored on the work table of a boring mill or jig borer. It may be supported by the posts 17 with the pins 29 in extended position, protruding from the upper face of the fixture.

The set screws 39 and 40 are retracted to an extent sufficient to permit manual rotation of the sleeve 21 throughout approximately 20° of rotational movement.

Likewise, the set screws 47 and 48 are retracted to an extent sufficient to permit manual rotation of the sleeve 24.

With the fixture and its parts in this position, a rotatable micrometer gauge may be rotated within the interior of the sleeve 11 in order to establish, with maximum possible precision, the location of the central axis 20 of the body of the fixture. Similarly, a rotary micrometer gauge may be rotated around the cylindrical protruding portion of the pin 29 in order to establish, with maximum possible certainty, the precise location of the axis of the pin 29. Once the location of the axis of the pin 29 has been located, with the maximum degree of precision, and the main axis 20 of the body of the fixture located with similar accuracy, the distance between these two axes may then be measured. This may be done optically or with gauge blocks or by any other means which will determine, with maximum accuracy, the precise distance between these two axes, the precise location of each of which has already been establish as above described.

To the extent that these two axes may be closer together or further apart than the precise predetermined distance, adjustment can easily and readily be made by manually rotating one or both of the sleeves until the spacing between these two axes corresponds, as nearly as possible, to the desired distance. When this condition has been achieved, the set screws 39, 40, 47, 48 and 49 are advanced to lock the sleeves in predetermined adjusted position.

In much the same manner, the circumferential spacing between all of the thirteen checking pins can be measured and adjusted and because of the latitude of adjustment which the presently described equipment provides, the circumferential spacing can be achieved and at the same time, provide for the precise radial location of each checking pin with respect to the central axis 20 of the checking fixture.

As will be readily appreciated from the foregoing, one of the important advantages of the construction herein described is that throughout its useful life it can constantly be remeasured, recalibrated and readjusted in order to assure maximum possible accuracy.

As has been pointed out above, the single example of a given, rather complicated fixture, has been shown in the drawings and described above. This fixture is merely illustrative of the manner in which the improvements of the present invention may be utilized to provide unproved checking gauges and fixtures within the scope of this invention as specifically defined in the following claims.

What is claimed is:

1. A checking device for checking the tolerance of a portion of a workpiece comprising a body portion having a cylindrical bore therethrough, a pair of cylindrically surfaced sleeves arranged in telescopic relationship with respect to said bore, and with respect to each other, the axis of the interior surface of each of said sleeves being parallel to and slightly offset from the axis of the exterior surface thereof and a cylindrical checking pin telescopically received within said sleeves, said checking pin having a guide portion intermediate the ends thereof in close fitting relation with at least a portion of said interior surface of said inner sleeve and a checking portion formed at one end thereof, said checking portion and having a diameter no greater than the diameter of said guide surface having a generally cylindrical exterior surface and extending axially in a direction from the interior of said inner sleeve toward the workpiece when the workpiece is placed adjacent said body portion.

2. A checking fixture comprising a body portion having a plurality of parallel cylindrical bores therethrough, an adjustable checking assembly rotatably mounted in each of said bores, said checking assembly comprising a pair of cylindrically surfaced sleeves arranged in telescopic relationship with respect to the bore in which said assembly is located, and with respect to each other, the axis of the interior surface of each of said sleeves being parallel to and slightly offset from the axis of the exterior surface thereof, and a cylindrically surface checking pin telescopically received within said sleeves.

3. A checking fixture comprising a body portion having a plurality of parallel cylindrical bores therethrough, an adjustable checking assembly rotatably mounted in each of said bores, said checking assembly comprising a body portion having a cylindrical bore therethrough, a pair of cylindrically surfaced sleeves arranged in telescopic relationship with respect to said bore, and with respect to each other, the axis of the interior surface of each of said sleeves being parallel to and slightly offset from the axis of the exterior surface thereof, a cylindrical checking pin telescopically received within said sleeves and means for locating said sleeves in predetermined, adjusted rotative position with respect to said body portion and with respect to each other.

4. A checking fixture comprising a body portion having a plurality of parallel cylindrical bores therethrough, an adjustable checking assembly rotatably mounted in each of said bores, said checking assembly comprising a pair of cylindrically surfaced sleeves arranged in telescopic relationship to said bore and with respect to each other, each of said sleeves having a radially extending flange on one end thereof, the flange on one of said sleeves being adapted to overlie the flange on the other of said sleeves, in order to locate said sleeves in predetermined axial position within said bore, the axis of the interior surface of each of said sleeves being parallel to but slightly offset from the axis of the exterior surface thereof and a checking pin telescopically received within said sleeves.

5. A checking device for checking the tolerance of a portion of a workpiece comprising a body portion having a cylindrical bore therethrough, a pair of cylindrically surfaced sleeves including an inner and outer sleeve arranged in telescopic relationship with respect to said bore and with respect to each other, the axis of the interior surface of each of said sleeves being parallel to and slightly offset from the axis of the outer surface thereof, and a cylindrically surfaced checking pin telescopically received within said inner sleeve, said checking pin having a guide portion in close fitting relation with at least a portion of said inner surface of said inner sleeve and at one end thereof a cylindrically surfaced checking portion extending a preselected length of said checking pin, said checking pin being axially movable from a position where the checking portion of said pin is entirely within said inner sleeve, to a position where the checking portion of said pin extends axially from the interior of said inner sleeve in a direction toward the workpiece when the workpiece is placed adjacent said body portion.

6. A device as called for in claim 5, including means engaging said checking pin serving to anchor the same in one of two axial positions with respect to said sleeves.

7. A checking device comprising a body portion having a cylindrical bore therethrough, a pair of cylindrically surfaced sleeves arranged in telescopic relationship to said bore and with respect to each other, each of said sleeves having a radially extending flange on one end thereof having an adjusting surface thereon, an adjusting screw threadably received in a bore in said body portion and in contact with said adjusting surface, said bore being disposed generally perpendicular to said adjusting surface at one position of said adjusting surface, said adjusting screw engaging the flange on said sleeve whereby adjustment of said screw serves to effect limited rotation of said sleeve.

8. A checking device comprising a body portion having a cylindrical bore therethrough, a pair of cylindrically surfaced sleeves arranged in telescopic relationship to said bore and with respect to each other, each of said sleeves having a radially extending flange on one end thereof having an adjusting surface thereon, a pair of adjusting screws threadably received within bores in said body portion and in contact with said adjusting surface, said bores been generally arranged generally perpendicular to said adjusting surface at one position of said adjusting surface, said adjusting screw being adapted to engage said flange whereby adjustment of said screws serves to effect limited rotation of said sleeve with respect to said body portion.

9. A checking device comprising a body portion having a cylindrical bore therethrough, a pair of cylindrically surfaced sleeves arranged in telescopic relationship to said bore and with respect to each other, each of said sleeves having a radially extending flange on one end thereof having an adjusting surface thereon, a pair of adjusting screws threadably received in said body portion adapted to engage each of the flanges of said sleeves, said screws being disposed generally perpendicular to said adjusting surface at one position of said adjusting surface with which they are associated, whereby adjustment of said screws serves to effect limited rotative movement of said sleeves with respect to said body portion.

References Cited by the Examiner

UNITED STATES PATENTS

| 730,178 | 6/1903 | Vaughan | 33—182 |
| 963,559 | 7/1910 | Hines | 33 |
| 1,096,492 | 5/1914 | Crowell | 33—72 |
| 1,303,633 | 5/1919 | Bryant | 33—174 |
| 1,449,506 | 3/1923 | Ford | 33—180 |
| 2,381,943 | 8/1945 | Williams | 33 |

LEONARD FORMAN, *Primary Examiner.*

S. S. MATTHEWS, *Assistant Examiner.*